United States Patent
Ma

(10) Patent No.: US 10,032,415 B2
(45) Date of Patent: Jul. 24, 2018

(54) PIXEL CIRCUIT AND DRIVING METHOD THEREOF, DISPLAY DEVICE

(71) Applicant: BOE TECHNOLOGY GROUP CO., LTD., Beijing (CN)

(72) Inventor: Zhanjie Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 80 days.

(21) Appl. No.: 15/104,333

(22) PCT Filed: Jan. 5, 2016

(86) PCT No.: PCT/CN2016/070089
§ 371 (c)(1),
(2) Date: Jun. 14, 2016

(87) PCT Pub. No.: WO2016/150232
PCT Pub. Date: Sep. 29, 2016

(65) Prior Publication Data
US 2017/0116919 A1    Apr. 27, 2017

(30) Foreign Application Priority Data

Mar. 25, 2015   (CN) .......................... 2015 1 0133658

(51) Int. Cl.
G09G 3/3258    (2016.01)
G09G 3/3291    (2016.01)
G02F 1/1362    (2006.01)

(52) U.S. Cl.
CPC ..... *G09G 3/3258* (2013.01); *G02F 1/136213* (2013.01); *G09G 3/3291* (2013.01);
(Continued)

(58) Field of Classification Search
CPC ...... G02F 1/136213; G09G 2300/0876; G09G 3/3233; G09G 2300/0819;
(Continued)

(56) References Cited

U.S. PATENT DOCUMENTS 9,478,164 B2 * 10/2016 Ma .................... G09G 3/3225
2009/0122630 A1 * 5/2009 Takahashi ............ G11C 7/065
365/207

(Continued)

FOREIGN PATENT DOCUMENTS

CN    103198788 A    7/2013
CN    103927984 A    7/2014
(Continued)

OTHER PUBLICATIONS

Park, et al., "A New Voltage Driven Pixel Circuit for Large Sized AMOLED Panel", AMD/OLEDp-6L, (Late-News Paper), IDW '04, p. 539-540.
(Continued)

*Primary Examiner* — Sanjiv D Patel
(74) *Attorney, Agent, or Firm* — Nath, Goldberg & Meyer; Joshua B. Goldberg

(57) ABSTRACT

The present invention provides a pixel circuit and a driving method thereof and a display device. The pixel circuit comprises a driving transistor, a storage capacitor, an organic light emitting device, a reset unit, a data writing unit and a voltage output unit. The reset unit is connected to a reset control signal line, an initialization signal line, the data writing unit, two ends of the storage capacitor, the voltage output unit, and a first electrode and a control electrode of the driving transistor. The control electrode of the driving transistor is connected to the second end of the storage capacitor, the first electrode thereof is connected to the voltage output unit, the second electrode thereof is con-
(Continued)

nected to the organic light emitting device. The data writing unit is connected to a gate line, a data line and the first end of the storage capacitor.

16 Claims, 3 Drawing Sheets

(52) U.S. Cl.
CPC .......... *G09G 2300/043* (2013.01); *G09G 2300/0876* (2013.01); *G09G 2320/0266* (2013.01); *G09G 2320/045* (2013.01); *G09G 2340/0407* (2013.01)

(58) Field of Classification Search
CPC ........ G09G 2320/043; G09G 2310/061; H01L 2924/00; H01L 2924/13091; H03K 17/615; H03F 1/308
See application file for complete search history.

(56) References Cited

U.S. PATENT DOCUMENTS

| | | | |
|---|---|---|---|
| 2009/0225011 A1 | 9/2009 | Choi | |
| 2011/0025586 A1* | 2/2011 | Lee | G09G 3/003 345/76 |
| 2011/0156611 A1 | 6/2011 | Tsai | |
| 2011/0164071 A1* | 7/2011 | Chung | G09G 3/3208 345/690 |
| 2013/0057532 A1* | 3/2013 | Lee | G09G 3/3225 345/211 |
| 2013/0314305 A1* | 11/2013 | Liu | G09G 3/32 345/77 |
| 2015/0170569 A1* | 6/2015 | Han | G09G 3/3258 345/78 |
| 2015/0279277 A1* | 10/2015 | Xu | G09G 3/3233 345/690 |
| 2016/0351120 A1* | 12/2016 | Itakura | G09G 3/3233 |

FOREIGN PATENT DOCUMENTS

| | | |
|---|---|---|
| CN | 103985352 A | 8/2014 |
| CN | 104050917 A | 9/2014 |
| CN | 203882587 U | 10/2014 |
| CN | 203882588 U | 10/2014 |
| CN | 104157240 A | 11/2014 |
| CN | 104680980 A | 6/2015 |
| JP | 2011081408 A | 4/2011 |
| JP | 2012058748 A | 3/2012 |
| JP | 2012108192 A | 6/2012 |

OTHER PUBLICATIONS

Fan, et al., "An AMOLED AC-Biased Pixel Design Compensating the Threshold Voltage and I-R Drop", International Journal of Photoenergy, vol. 2011 (2011), Article ID 543273, 6 pages, doi: 10.1155/2011/543273.
Form PCT/ISA/210 issued in corresponding international application No. PCT/CN2016/070089 dated Mar. 29, 2016.
Form PCT/ISA/220 issued in corresponding international application No. PCT/CN2016/070089 dated Mar. 29, 2016.
Form PCT/ISA/237 issued in corresponding international application No. PCT/CN2016/070089 dated Mar. 29, 2016.

* cited by examiner

PIXEL CIRCUIT AND DRIVING METHOD THEREOF, DISPLAY DEVICE

This is a National Phase Application filed under 35 U.S.C. 371 as a national stage of PCT/CN2016/070089, filed Jan. 5, 2016, an application claiming the benefit of Chinese Application No. 201510133658.4, filed Mar. 25, 2015, the content of each of which is hereby incorporated by reference in its entirety.

FIELD OF THE INVENTION

The present invention relates to the field of display technology, and particularly to a pixel circuit and a driving method thereof, and a display device.

BACKGROUND OF THE INVENTION

Organic light emitting diodes (OLEDs), as current-driven light emitting devices, have been applied to high performance displays more and more. With the increase of size of a display, a traditional passive matrix OLED display requires a shorter time period to drive an individual pixel and thus transient current needs to be increased and power consumption will be increased. Meanwhile, application with large current may cause too large voltage drop on ITO lines, resulting in a too high operation voltage of the OLED and a low efficiency thereof. An active matrix OLED display can solve these problems well by inputting currents into the OLEDs in a progressive scanning manner by switching transistors.

In the design of the AMOLED backplane, a main problem to be solved is the non-uniformity in brightness between pixels.

An AMOLED voltage type pixel unit driving circuit is provided in the prior art. Compared with the traditional AMLCD driving method, in the voltage type pixel unit driving circuit, a voltage signal representing a grey scale is provided by the driving unit, the voltage signal can be converted into a current signal for driving a transistor in the pixel circuit so as to drive the OLED to realize gray scale in brightness, this method can lead to a fast driving speed and can be realized simply, is suitable to drive a large-sized panel, and thus it is widely adopted in the art. However, it is required to design an additional TFT and a capacitor to compensate for the non-uniformity of TFT, IR Drop and non-uniformity of OLEDs.

FIG.1 shows a circuit structure of a most traditional voltage-driven pixel unit consisting of two TFTs and a capacitor (2T1C). The switch transistor TK transmits a data voltage Vdata, representing a gray scale, on the data line to a gate of the driving transistor TQ, the driving transistor converts the data voltage Vdata into a corresponding current to supply to the OLED, during a normal operation, the driving transistor TQ should be in a saturation region and supplies a constant current during a scan period for a row. The operation current of the driving transistor TQ, that is, the operation current of the OLED, may be represented as:

$$I_{OLED} = \frac{1}{2} \mu_n \cdot Cox \cdot \frac{W}{L} \cdot (Vdata - Voled - Vthn)^2$$

where $\mu_n$ is a carrier mobility, $C_{ox}$ is a capacitance of a gate oxide layer, W/L is a width-length ratio of the transistor, Vdata is the data voltage, Voled is an operating voltage of the OLED and is shared by all pixel units, Vthn is a threshold voltage of the pixel unit (that is, the threshold voltage of the driving transistor TQ), for an enhanced-mode TFT, Vthn thereof is positive, and for a depletion mode TFT, Vthn thereof is negative.

Although the driving circuit of the pixel unit in the prior art is widely used, the following problems are still unavoidable: if different pixel units are different in Vthn, currents of the OLEDs are certainly different. If the Vthn of the pixel unit is drifted over time, currents of the OLED after and before the drift of the threshold may be different, leading to ghost. In addition, difference in the operating voltages of the OLEDs caused by non-uniformity of the OLEDs may result in different operating currents of the OLEDs.

SUMMARY OF THE INVENTION

In view of the problem in which display non-uniformity exists in the existing pixel circuit, the present invention provides a pixel driving circuit and a driving method thereof, and a display device, which can effectively avoid the adverse effect on display caused by the threshold voltage of the driving transistor, and can effectively increase the resolution.

A solution adopted to solve the above problem in the present invention is a pixel circuit, comprising a driving transistor, a storage capacitor and an organic light emitting device, wherein the pixel circuit further comprising a reset unit, a data writing unit and a voltage output unit, the reset unit being connected to a reset control signal line, an initialization signal line, the data writing unit, a first end and a second end of the storage capacitor, the voltage output unit, and a first electrode and a control electrode of the driving transistor; the control electrode of the driving transistor being further connected to the second end of the storage capacitor, the first electrode of the driving transistor being further connected to the voltage output unit, the second electrode of the driving transistor being connected to a first terminal of the organic light emitting device, and a second terminal of the organic light emitting device being connected to a low voltage supply; and the data writing unit being connected to a gate line, a data line and the first end of the storage capacitor, wherein the reset unit resetting, under the control of a reset control signal input by the reset control signal line, the first end of the storage capacitor to an initialization voltage input by the initialization signal line, and resetting the second end of the storage capacitor to a first voltage output by the voltage output unit;

the data writing unit writing, under the control of a gate scan signal input by the gate line, a data voltage input by the data line and a equivalent threshold voltage of the driving transistor into the first end of the storage capacitor; and the driving transistor driving, when the voltage output unit outputting a second voltage, the organic light emitting device to emit light.

Preferably, the reset unit comprising a first transistor and a second transistor, and wherein a first electrode of the first transistor being connected to the initialization signal line, a second electrode of the first transistor being connected to the first end of the storage capacitor and the data writing unit, and a control electrode of the first transistor being connected to the reset control signal line; and a first electrode of the second transistor being connected to the voltage output unit, a second electrode of the second transistor being connected to the second end of the storage capacitor and the control electrode of the driving transistor, and a control electrode of the second transistor being connected to the reset control signal line.

Preferably, the data writing unit comprising a third transistor and a fourth transistor, wherein a first electrode of the third transistor being connected to a control electrode of the fourth transistor, a second electrode of the third transistor being connected to the first end of the storage capacitor and the reset unit, and a control electrode of the third transistor being connected to the gate line; and a first electrode of the fourth transistor being connected to the data line, a second electrode of the fourth transistor being connected to the first end of the storage capacitor and the reset unit, and a threshold voltage of the fourth transistor being the equivalent threshold voltage of the driving transistor.

Preferably, the voltage output unit outputting a voltage signal as a pulse signal.

Further preferably, the first voltage is a low level signal, and the second voltage is a high level signal.

Preferably, the first to fourth transistors and the driving transistor are P type transistors, the first electrode is a source electrode and the second electrode is a drain electrode.

A solution adopted to solve the above problem in the present invention is a driving method of a pixel circuit, wherein the pixel circuit is any one of the above pixel circuits, the driving method comprising:

a reset period: the reset control signal input by the reset control signal line being a gate signal, the reset unit being gated, so that the first end of the storage capacitor being reset to the initialization voltage and the second end of the storage capacitor being reset to the first voltage output by the voltage output unit;

a data writing period: the reset unit being turned off, the gate scan signal input to the gate line being a gage signal, the data voltage and the equivalent threshold voltage of the driving transistor being written to the first end of the storage capacitor; and a light emitting period: the voltage output unit outputting the second voltage, the driving transistor driving the organic light emitting device to emit light.

Preferably, the reset unit comprising a first transistor and a second transistor, and wherein during the reset period, the first transistor and the second transistor being gated by the reset control signal line, the initialization voltage being written into the first end of the storage capacitor by the first transistor, and the first voltage output from the voltage output unit being written into the second end of the storage capacitor by the second transistor.

Preferably, the data writing unit comprising a third transistor and a fourth transistor, and wherein during the data writing period, the gate scan signal input from the gate line being a gate signal, the third transistor being turned on, so that a control electrode of the fourth transistor being connected to the second electrode of the fourth transistor, a data voltage on the data line connecting with a first electrode of the fourth transistor and a threshold voltage of the fourth transistor being written into the first end of the storage capacitor, the threshold voltage of the fourth transistor being an equivalent threshold voltage of the driving transistor.

Preferably, during the light emitting period, the voltage output unit outputting a second voltage, and the driving transistor driving the organic light emitting device to emit light under the control of the first voltage, the second voltage, the initialization voltage and the data voltage.

Preferably, the first voltage is a low level signal, and the second voltage is a high level signal.

Preferably, the first to fourth transistors and the driving transistor are P type transistors, the first electrode is a source electrode and the second electrode is a drain electrode.

A solution adopted to solve the above problem in the present invention is a display device comprising the above display panel.

The present invention has the following advantages:

The pixel circuit provided in the present invention omits the light-emitting control lines, thus a sequence for controlling light-emitting is not needed, and the number of the signal lines of the pixel is decreased, therefore, facilitating to increase the resolution of the display panel.

The driving method of the pixel circuit provided by the present invention is used to drive the above pixel circuit, is simple in the sequence and is not affected by the threshold voltage of the transistor during driving, and therefore, the problem of display non-uniformity in the prior art is avoided.

The display device provided by the present invention comprises the above pixel circuit, thus its resolution is increased and the display effect is better.

DETAILED DESCRIPTION OF THE EMBODIMENTS

In order to make a person skilled in the art better understand the solutions of the present invention, the present invention will be further described in detail below in conjunction with the drawings and the embodiments.

The transistor adopted in the embodiments of the present invention may be a thin film transistor or a field effect transistor or other device having the same property, and since the source and the drain of the used transistor are symmetric, there is no difference between the source and the drain. In the embodiments of the present invention, in order to distinguish the source and the drain of the transistor, one of the drain and the source is called a first electrode, the other one is called a second electrode, and the gate is called a control electrode. In addition, transistors may be classified into a N type transistor and a P type transistor according to the properties of the transistors, the following embodiments will be described by taking the P type transistor as an example, wherein the first electrode is the source of the P type transistor, and the second electrode is the drain of the P type transistor. It can be easily conceived by a person skilled in the art to realize the present invention by using the N type transistors without creative effort, which falls within the scope of the embodiments of the present invention.

First Embodiment

Figure 1:
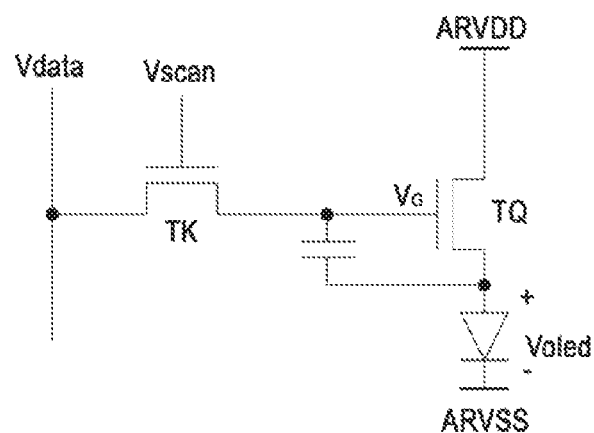
FIG. 1 is a structural diagram of an existing pixel circuit.
Figure 2:
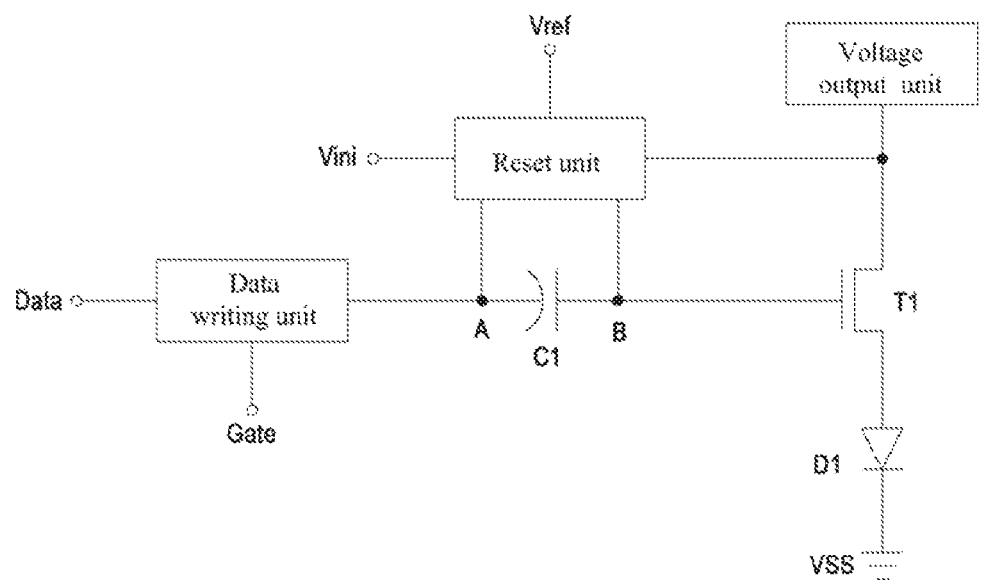
FIG. 2 is structural diagram of a pixel circuit of a first embodiment of the present invention.

As shown in FIG. 2, the present embodiment provides a pixel circuit, which comprises: a driving transistor T1, a storage capacitor C1, an organic light emitting device D1, a reset unit, a data writing unit and a voltage output unit VDD. The reset unit is connected to a reset control signal line, an initialization signal line, the data writing unit, a first end A and a second end B of the storage capacitor C1, the voltage output unit VDD, and a first electrode and a control electrode of the driving transistor T1 The control electrode of the driving transistor T1 is further connected to the second end of the storage capacitor, the first electrode of the driving transistor is further connected to the voltage output unit VDD, the second electrode of the driving transistor T1 is connected to a first terminal of the organic light emitting device D1, and a second terminal of the organic light emitting device D1 is connected to a low voltage supply VSS. The data writing unit is connected to a gate line Gate and a data line Data. The reset unit is turned on, under the control of a reset control signal Vref input by the reset control signal line, resets the first end A of the storage capacitor C1 to an initial voltage Vini, and resets the second end B of the storage capacitor C1 to a first voltage V1 output by the voltage output unit VDD, through the initialization signal line. The data writing unit is turned on, under the control of a gate scan signal input by the gate line Gate, and writes a data voltage Vdata input by the data line Data and an equivalent threshold compensation voltage of the driving transistor into the first end A of the storage capacitor C1. The driving transistor T1 is turned on when the voltage output unit VDD outputs a second voltage V2, so as to drive the organic light emitting device D1 to emit light. Preferably, the voltage signal output by the voltage output unit is a pulse signal.

Specifically, when the reset control signal Vref input by the reset control signal line is a gate signal, the reset unit is turned on, therefore, the initialization signal line resets potential of the first end A of the storage capacitor C1 to the initialization voltage Vini through the reset unit, while the voltage output by the voltage output unit VDD is the first voltage V1, potential of the second end B of the storage capacitor C1 is reset to the first voltage V1 through writing by the reset unit. It can be seen that, at this time, the potential of the first end A of the storage capacitor C1 is the initialization voltage Vini, and the potential of the second end B of the storage capacitor C1 is the first voltage V1.

When the gate line Gate is gated by the gate scan signal, the data writing unit connected to the gate line Gate is turned on, and the reset unit is turned off, the data voltage Vdata charges the storage capacitor C1 through the data writing unit, meanwhile, the equivalent threshold compensation voltage of the driving transistor T1 is written into the first end A of the storage capacitor through the data line Data as well, and the storage capacitor C1 holds a constant voltage difference between both ends thereof according to the bootstrap characteristic of its own.

When the voltage output unit VDD outputs the second voltage V2, the driving transistor T1 is turned on, and the driving transistor T1 drives the organic light emitting device D1 to emit light.

It should be noted that, the first voltage V1 is a low level signal, and the second voltage V2 is a high level signal.

Figure 3:
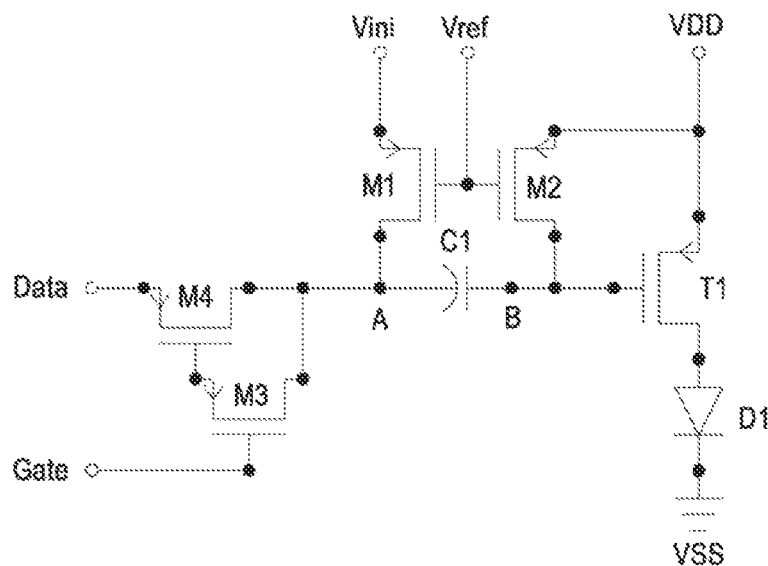
FIG. 3 is a structural diagram of a preferable pixel circuit of a first embodiment of the present invention.

With reference to FIG. 3, preferably, the reset unit comprises a first transistor M1 and a second transistor M2. A first electrode of the first transistor M1 is connected to the initialization signal line, a second electrode of the first transistor M1 is connected to the first end A of the storage capacitor C1 and the data writing unit, and a control electrode of the first transistor M1 is connected to the reset control signal line. A first electrode of the second transistor M2 is connected to the voltage output unit, a second electrode of the second transistor M2 is connected to the second end B of the storage capacitor C1 and the control electrode of the driving transistor T1, and a control electrode of the second transistor M2 is connected to the reset control signal line.

Specifically, when a gate signal (that is, a low level signal) is input by the reset control signal line, the first transistor M1 and the second transistor M2 are in ON state, the initialization voltage Vini input into the initialization signal line is written into the first end A of the storage capacitor C1 by the first transistor M1, the first voltage V1 output by the voltage output unit VDD is written into the second end B of the storage capacitor C1 by the second transistor M2. It can be seen from above that, the voltage of the first end A of the storage capacitor C1 is the initialization voltage Vini, and the voltage of the second end B of the storage capacitor C1 is the first voltage V.

Preferably, the data writing unit comprises a third transistor M3 and a fourth transistor M4. A first electrode of the third transistor M3 is connected to a control electrode of the fourth transistor M4, a second electrode of the third transistor M3 is connected to the first end A of the storage capacitor C1 and the reset unit, and a control electrode of the third transistor M3 is connected to the gate line Gate. A first electrode of the fourth transistor M4 is connected to the data line Data, a second electrode of the fourth transistor M4 is connected to the first end A of the storage capacitor C1 and the reset unit.

Specifically, when a gate scan signal is input to the gate line Gate, the third transistor M3 is turned on, thus the voltage of the first electrode of the third transistor M3 is equal to that of the second electrode thereof, since the first electrode of the third transistor M3 is connected to the control electrode of the fourth transistor M4, and the second electrode of the third transistor M3 is connected to the second electrode of the fourth transistor M4, therefore the voltage of the control electrode of the fourth transistor M4 is equal to that of the second electrode of the fourth transistor M4. It can be seen from above that, at this time, the fourth transistor M4 is equivalent to a diode which has the characteristics of unidirectional conduction, as the first end A of the storage capacitor C1 is connected to the second electrode of the fourth transistor M4, therefore, at this time, the potential of the first end A of the storage capacitor C1 is a sum of the data voltage Vdata and the threshold voltage Vth4 of the fourth transistor M4, that is, Vdata+Vth4. Due to the bootstrap characteristic of the storage capacitor C1 at this time, the voltage of the second end B of the storage capacitor C1 is a sum of the data voltage Vdata plus the threshold voltage Vth4 of the fourth transistor M4 minus the initialization voltage Vini plus the first voltage V1, that is, Vdata+Vth4−Vini+V1.

After this, the organic light emitting device D1 is driven to emit light, since the voltage of the second end B of the storage capacitor C1 is Vdata+Vth4−Vini+V1, and the voltage of the first electrode of the driving transistor T1 is the second voltage V2 output by the voltage output unit VDD at this time, in order to ensure that the driving transistor T1 is turned on, that is, Vgs<0, so that Vdata+Vth4−Vini+V1−V2<0, and the driving transistor T1 operates in the saturation region, at this time, the current of the driving transistor T1 is: Ids=½*K*(Vgs−Vth)^2=½*K*{Vdata+Vth4−Vini+V1−V2−Vth}^2, wherein due to the manufacturing process, the fourth transistor M4 and the driving transistor T1 have substantially the same characteristics, thus it is possible to regard that the voltage Vth4 is equivalent to the voltage Vth, that is to say, the threshold voltage of the fourth transistor M4 is the equivalent threshold voltage of the driving transistor T1, therefore, the above formula can be rewritten into: Ids=½*K*(Vgs−Vth)^2=½*K*{Vdata−Vini+V1−V2}^2. It can be seen that the current of the driving transistor T1 has nothing to do with the threshold voltage thereof, so that the current of the driving transistor T1 cannot be affected by the threshold voltage Vth thereof, that is to say, the threshold voltage Vth of the driving transistor T1 will not affect the uniformity of light emitted by the organic light emitting device D1.

Also, light-emitting control line is omitted in the pixel circuit provided by the present embodiment, thus it is not needed to control the sequence of emitting light, so that the number of the signal lines of the pixel is reduced, facilitating to increase the resolution of the display device.

Figure 5:
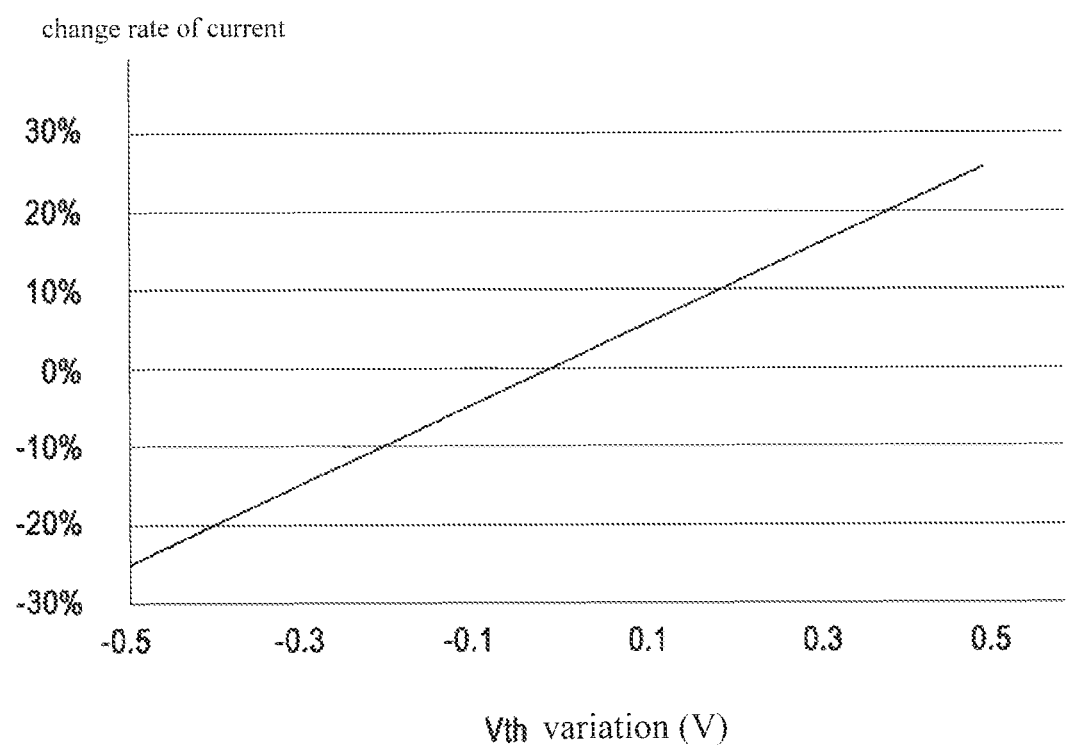
FIG. 5 is a simulation diagram of a compensation effect when the pixel circuit shown in FIG. 3 is in a low gray-scale state.

As shown in FIG. 5, this figure is an effect diagram of compensation for Vth, since the organic light emitting device is more sensitive to current in a low gray scale, when evaluating the compensation effect of the pixel circuit, it can be judged by means of the ratio of current to change of Vth in a low gray scale. Without compensation, the ratio of current to change of Vth may reach 100%, thus the pixel circuit has better compensation effect.

Accordingly, the present embodiment further provides a display device comprising the above display panel, and thus the display device has higher resolution and better display performance.

Second Embodiment

The present embodiment provides a driving method of a pixel circuit, wherein the driving method is used to drive the pixel circuit in the first embodiment.

The driving method provided in the present embodiment specifically comprises:

a reset period: the reset control signal input by the reset control signal line is a gate signal, the reset unit is gated, so that the first end A of the storage capacitor C1 is reset to the initialization voltage Vini and the second end B of the storage capacitor C1 is reset to the first voltage V1 output by the voltage output unit VDD;

a data line Data writing period: the reset unit is turned off, the gate scan signal input to the gate line Gate is a gate signal, the data voltage Vdata and the equivalent threshold compensation voltage of the driving transistor T1 are written to the first end A of the storage capacitor C1; and a light emitting period: the voltage output unit VDD outputs the second voltage V2, the driving transistor T1 is turned on to drive the organic light emitting device D1 to emit light.

Figure 4:
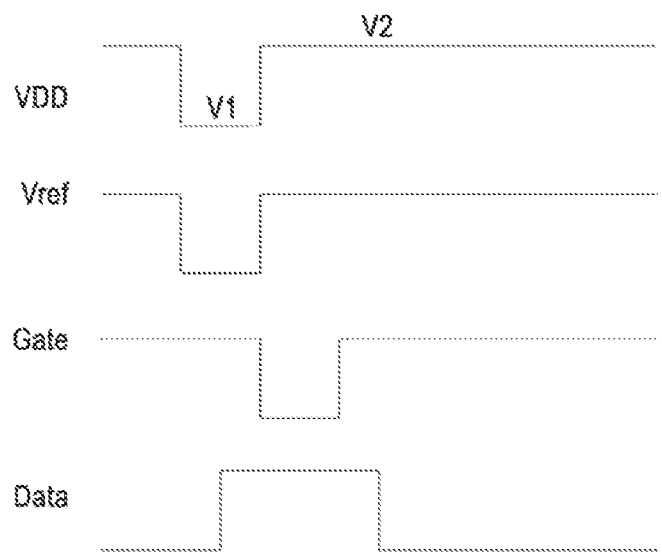
FIG. 4 is a sequence diagram illustrating operation of the pixel circuit shown in FIG. 3.

In conjunction with the pixel circuit shown in FIG. 3 and the sequence diagram illustrating operation of the pixel circuit in FIG. 3 shown in FIG. 4, the driving method of the pixel circuit of the present embodiment will be described in detail.

With reference to the pixel circuit shown in FIG. 3, the reset module therein comprises a first transistor M1 and a second transistor M2, the data writing module therein comprises a third transistor M3 and a fourth transistor M4, since the fourth transistor M4 and the driving transistor T1 have substantially the same characteristics, the threshold voltage of the fourth transistor M4 is the equivalent threshold voltage of the driving transistor T1.

In the reset period: a reset control signal input to the reset control signal line is a gate signal (low level signal), the first transistor M1 and the second transistor M2 are turned on, at this time, since the voltage of the first electrode of the first transistor M1 is the initialization voltage Vini, the potential of the first end A of the capacitor C1 is reset to the initialization voltage Vini, meanwhile, the voltage output unit VDD outputs the first voltage V1 (low level signal) and transmits it to the first electrode of the second transistor M2, thus the potential of the second end B of the storage capacitor C1 is the first voltage V1. Meanwhile, since the first voltage V1 output by the voltage output unit VDD is also transmitted to the first electrode of the driving transistor T1, the voltage of the first electrode of the driving transistor T1 is the same as that of the control electrode of the driving transistor T1, therefore, in this period, the driving transistor T1 is in OFF state, so that there is no current flowing into the organic light emitting device D1, that is, the organic light emitting device D1 does not emit light.

In the data writing period: the reset control signal input to the reset control signal line is a high level signal, the first transistor M1 and the second transistor M2 are turned off, the gate line Gate is gated by the input gate scan signal (that is, low level signal), thus the third transistor M3 is turned on, so that the second electrode of the fourth transistor M4 is connected to the control electrode of the fourth transistor M4. It should be understood that, at this time, the fourth transistor M4 is equivalent to a diode, and the first end A of the storage capacitor C1 is charged to a sum of the data voltage Vdata and the threshold voltage Vth4 of the fourth transistor M4, that is, Vdata+Vth4, due to the characteristics of unidirectional conduction of the diode, it is required to ensure that Vdata+Vth4>Vini. According to the bootstrap characteristic of the storage capacitor C1, voltage between two ends of the storage capacitor C1 is held, therefore, the voltage of the second end B of the storage capacitor C1 is a sum of the data voltage Vdata plus the threshold voltage Vth4 of the fourth transistor M4 minus the initialization voltage Vini plus the first voltage V1, that is, Vdata+Vth4−Vini+V1. At the same time, since the voltage output by the voltage output unit VDD is still the first voltage V1, the voltage of the first electrode of the driving transistor T1 is still the first voltage V1, and the driving transistor T1 keeps off state.

In the light emitting period: the voltage output by the voltage output unit VDD is changed from the first voltage V1 to the second voltage V2 (high level signal). Since the voltage of the second end B of the storage capacitor C1 is Vdata+Vth4−Vini+V1, and the voltage of the first electrode of the driving transistor T1 is the second voltage V2 output by the voltage output unit VDD at this time, in order to ensure that the driving transistor T1 is turned on, that is, Vgs<0, so that Vdata+Vth4−Vini+V1−V2<0, and the driving transistor T1 operates in the saturation region, at this time, the current of the driving transistor T1 is: Ids=½*K*(Vgs−Vth)^2=½*K*{Vdata+Vth4−Vini+V1−V2−Vth}^2, wherein due to the manufacturing process, the fourth transistor M4 and the driving transistor T1 have substantially the same characteristics, thus it is possible to regard that the voltage Vth4 is equivalent to the voltage Vth, that is to say, the threshold voltage of the fourth transistor M4 is the equivalent threshold voltage of the driving transistor T1, therefore, the above formula can be rewritten into: Ids=½*K*(Vgs−Vth)^2=½*K*{Vdata−Vini+V1−V2}^2. It can be seen that the current of the driving transistor T1 has nothing to do with the threshold voltage thereof, so that the current of the driving transistor T1 cannot be affected by the threshold voltage Vth thereof, that is to say, the threshold voltage Vth of the driving transistor T1 will not affect the uniformity of light emitted by the organic light emitting device D1.

It can be understood that the foregoing implementations are merely exemplary embodiments for the purpose of explaining the principle of the present disclosure, but the present disclosure is not limited thereto. Various modifications and improvements can be made by those of ordinary skills in the art without departing from the spirit and essence of the present disclosure. These modifications and improvements shall also fall into the protection scope of the present disclosure.

What is claimed is:

1. A pixel circuit, comprising a driving transistor, a storage capacitor and an organic light emitting device, the pixel circuit further comprising a reset unit, a data writing unit and a voltage output unit, the reset unit being connected to a reset control signal line, an initialization signal line, the data writing unit, a first end and a second end of the storage capacitor, the voltage output unit, and a first electrode and a control electrode of the driving transistor; the control electrode of the driving transistor being further connected to the second end of the storage capacitor, the first electrode of the driving transistor being further connected to the voltage output unit, the second electrode of the driving transistor being connected to a first terminal of the organic light emitting device, and a second terminal of the organic light emitting device being connected to a low voltage supply; and the data writing unit being connected to a gate line, a data line and the first end of the storage capacitor; wherein the reset unit, under the control of a reset control signal input by the reset control signal line, resets the first end of the storage capacitor to an initialization voltage input by the initialization signal line, and resets the second end of the storage capacitor to a first voltage output by the voltage output unit;

the data writing unit, under the control of a gate scan signal input by the gate line, writes a data voltage input by the data line and an equivalent threshold voltage of the driving transistor into the first end of the storage capacitor;

the driving transistor, when the voltage output unit outputs a second voltage, drives the organic light emitting device to emit light;

wherein the data writing unit comprises a third transistor and a fourth transistor, wherein a first electrode of the third transistor is connected to a control electrode of the fourth transistor, a second electrode of the third transistor is connected to the first end of the storage capacitor and the reset unit, and a control electrode of the third transistor is connected to the gate line; and a first electrode of the fourth transistor is connected to the data line, a second electrode of the fourth transistor is connected to the first end of the storage capacitor and the reset unit, and a threshold voltage of the fourth transistor is the equivalent threshold voltage of the driving transistor.

2. The pixel circuit of claim 1, wherein the reset unit comprises a first transistor and a second transistor, and wherein a first electrode of the first transistor is connected to the initialization signal line, a second electrode of the first transistor is connected to the first end of the storage capacitor and the data writing unit, and a control electrode of the first transistor is connected to the reset control signal line; and a first electrode of the second transistor is connected to the voltage output unit, a second electrode of the second transistor is connected to the second end of the storage capacitor and the control electrode of the driving transistor, and a control electrode of the second transistor is connected to the reset control signal line.

3. The pixel circuit of claim 1, wherein the voltage output unit outputs a voltage signal as a pulse signal.

4. The pixel circuit of claim 3, wherein the first voltage is a low level signal, and the second voltage is a high level signal.

5. The pixel circuit of claim 2, wherein the first to fourth transistors and the driving transistor are P type transistors, the first electrode is a source electrode and the second electrode is a drain electrode.

6. A driving method of a pixel circuit, wherein the pixel circuit is the pixel circuit of claim 1, the driving method comprising:

a reset period: causing the reset control signal input by the reset control signal line to be a gate signal so that the reset unit is turned on, the first end of the storage capacitor is reset to the initialization voltage and the second end of the storage capacitor is reset to the first voltage output by the voltage output unit;

a data writing period: causing the reset unit to be turned off and the gate scan signal input to the gate line to be a gate signal so that the data voltage and the equivalent threshold voltage of the driving transistor are written to the first end of the storage capacitor; and a light emitting period: causing the voltage output unit to output the second voltage so that the driving transistor drives the organic light emitting device to emit light.

7. The driving method of a pixel circuit of claim 6, wherein the reset unit comprises a first transistor and a second transistor, and wherein during the reset period, the first transistor and the second transistor are gated by the reset control signal line, the initialization voltage is written into the first end of the storage capacitor by the first transistor, and the first voltage output from the voltage output unit is written into the second end of the storage capacitor by the second transistor.

8. The driving method of a pixel circuit of claim 7, wherein the data writing unit comprises a third transistor and a fourth transistor, and wherein during the data writing period, the gate scan signal input from the gate line is a gate signal, the third transistor is turned on, so that a control electrode of the fourth transistor is connected to the second electrode of the fourth transistor, a data voltage on the data line connected to a first electrode of the fourth transistor and a threshold voltage of the fourth transistor are written into the first end of the storage capacitor, and the threshold voltage of the fourth transistor is an equivalent threshold voltage of the driving transistor.

9. The driving method of a pixel circuit of claim 8, wherein during the light emitting period, the voltage output unit outputs a second voltage, and the driving transistor drives the organic light emitting device to emit light under the control of the first voltage, the second voltage, the initialization voltage and the data voltage.

10. The driving method of a pixel circuit of claim 9, wherein the first voltage is a low level signal, and the second voltage is a high level signal.

11. The driving method of a pixel circuit of claim 6, wherein the first to fourth transistors and the driving transistor are P type transistors, the first electrode is a source electrode and the second electrode is a drain electrode.

12. The driving method of a pixel circuit of claim 7, wherein the first to fourth transistors and the driving transistor are P type transistors, the first electrode is a source electrode and the second electrode is a drain electrode.

13. The driving method of a pixel circuit of claim 8, wherein the first to fourth transistors and the driving transistor are P type transistors, the first electrode is a source electrode and the second electrode is a drain electrode.

14. The driving method of a pixel circuit of claim 9, wherein the first to fourth transistors and the driving transistor are P type transistors, the first electrode is a source electrode and the second electrode is a drain electrode.

15. A display device, comprising the pixel circuit of claim 1.

16. A display device, comprising the pixel circuit of claim 2.

* * * * *